(12) United States Patent
Meredith et al.

(10) Patent No.: US 9,735,909 B2
(45) Date of Patent: *Aug. 15, 2017

(54) RADIO REPEATER SYSTEM FOR AVOIDING MOBILE DEVICE LOCATION INTERFERENCE

(71) Applicant: AT&T Mobility II LLC, Atlanta, GA (US)

(72) Inventors: Sheldon Kent Meredith, Marietta, GA (US); Mark Austin, Roswell, GA (US); Francisco Martinez, Cumming, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/205,338

(22) Filed: Jul. 8, 2016

(65) Prior Publication Data

US 2016/0323055 A1    Nov. 3, 2016

Related U.S. Application Data

(63) Continuation of application No. 14/011,287, filed on Aug. 27, 2013, now Pat. No. 9,420,557.

(51) Int. Cl.
*H04B 3/36* (2006.01)
*H04J 11/00* (2006.01)
(Continued)

(52) U.S. Cl.
CPC ............ *H04J 11/0026* (2013.01); *H04B 3/36* (2013.01); *H04B 17/318* (2015.01); *H04L 43/16* (2013.01); *H04W 64/00* (2013.01)

(58) Field of Classification Search
CPC .. H04B 17/318; H04B 3/36; H04J 1/10; H04J 11/0026; H04W 64/00; H04W 84/042;
(Continued)

(56) References Cited

U.S. PATENT DOCUMENTS 5,634,191 A    5/1997  Beasley
5,995,804 A   11/1999  Rootsey et al.
(Continued)

OTHER PUBLICATIONS

Jiang et al., "Base Station Cooperation Based on Location-Aided in Cellular System," Canadian Conference on Electrical and Computer Engineering, 2009, pp. 157-160.
(Continued)

*Primary Examiner* — Wayne Cai
(74) *Attorney, Agent, or Firm* — Amin, Turocy & Watson, LLP

(57) ABSTRACT

A radio repeater system is described that disables itself to avoid interfering with mobile network performed multilateration of mobile devices. The radio repeater provides additional network coverage for a localized area. The localized area can include enclosed spaces such as buildings or transportation terminals. The radio repeater system can monitor the signals received from cell towers, and if there are at least three signals of a predetermined signal strength, the radio repeater can disable itself to avoid interfering with mobile locating performed by the network. The radio repeater can remain disabled until the conditions that led to the disabling have passed.

20 Claims, 10 Drawing Sheets

(51) Int. Cl.
*H04W 64/00* (2009.01)
*H04B 17/318* (2015.01)
*H04L 12/26* (2006.01)

(58) Field of Classification Search
CPC .... H04W 84/045; H04W 84/047; H04L 43/16
USPC .......................................... 455/7, 456.1, 424
See application file for complete search history.

(56) References Cited

U.S. PATENT DOCUMENTS

| | | | |
|---|---|---|---|
| 7,007,305 | B2 | 2/2006 | Carson et al. |
| 7,035,587 | B1 | 4/2006 | Yarkosky |
| 7,299,005 | B1 | 11/2007 | Yarkosky et al. |
| 7,715,853 | B1 | 5/2010 | Frerking et al. |
| 7,751,778 | B1 | 7/2010 | Ngan |
| 7,764,924 | B1 | 7/2010 | Smithey et al. |
| 8,121,535 | B2 | 2/2012 | Proctor, Jr. et al. |
| 8,717,964 | B2 * | 5/2014 | Chen ................ H04W 88/04 370/252 |
| 2003/0119460 | A1 | 6/2003 | Zipper |
| 2004/0219930 | A1 | 11/2004 | Lin |
| 2006/0025072 | A1 | 2/2006 | Pan |
| 2010/0009625 | A1 | 1/2010 | Chami et al. |
| 2010/0113063 | A1 * | 5/2010 | Han ....................... G01S 5/02 455/456.1 |
| 2010/0261425 | A1 | 10/2010 | Almgren et al. |
| 2011/0034122 | A1 | 2/2011 | Kennedy, Jr. et al. |
| 2011/0177827 | A1 * | 7/2011 | Crilly, Jr. ............ H04W 52/143 455/456.1 |
| 2011/0188413 | A1 | 8/2011 | Kuo et al. |
| 2012/0214406 | A1 | 8/2012 | Risheq et al. |
| 2012/0300694 | A1 * | 11/2012 | Watanabe ............ H04W 16/32 370/315 |
| 2013/0072112 | A1 | 3/2013 | Gunnarsson |

OTHER PUBLICATIONS

Lee et al., "The Smart Antenna Module for RF Repeater," 2011 17th Asia-Pacific Conference on Communications (APCC) Oct. 2-5 2011, pp. 599-603.

Mahboob et al, "Adaptive Interference Cancellation System for a WCDMA Repeater," 2010 23rd Canadian Conference on Electrical and Computer Engineering (CCECE), 2010, 5 pages.

Wang et al, "The Algorithm for Wireless Location Error and Performance Analysis in Mobile Communications System," 2010 International Conference on Intelligent Computation Technology and Automation (ICICTA), 2010, vol. 3, pp. 686-689.

Non-Final Office Action for U.S. Appl. No. 14/011,287 dated Apr. 1, 2015, 43 pages.

Final Office Action for U.S. Appl. No. 14/011,287 dated Oct. 1, 2015, 23 pages.

Notice of Allowance for U.S. Appl. No. 14/011,287 dated Apr. 11, 2016, 20 pages.

* cited by examiner

RADIO REPEATER SYSTEM FOR AVOIDING MOBILE DEVICE LOCATION INTERFERENCE

CROSS-REFERENCE TO RELATED APPLICATIONS

This application is a continuation of U.S. patent application Ser. No. 14/011,287, filed Aug. 27, 2013, and entitled "RADIO REPEATER SYSTEM FOR AVOIDING MOBILE DEVICE LOCATION INTERFERENCE". The entirety of the aforementioned application is hereby incorporated herein by reference.

TECHNICAL FIELD

The subject disclosure relates to wireless communications, and more specifically to a radio repeater system that precludes disruption of mobile device location.

BACKGROUND

A radio repeater receives signals from macrocells and other base station devices, and retransmits the signals to mobile devices, boosting the signals in the process. Radio repeaters also receive signals from the mobile devices and retransmit the signals to the base station devices. Radio repeaters can interfere with mobile device location performed by the network in two ways. Radio repeaters can cause amplification loop or parasitic oscillations as well as introducing time delays when repeating signals. These time delays offset geolocating algorithms which are based on differences of observed signal timing between base station devices and mobile devices.

DETAILED DESCRIPTION

Figure 1:
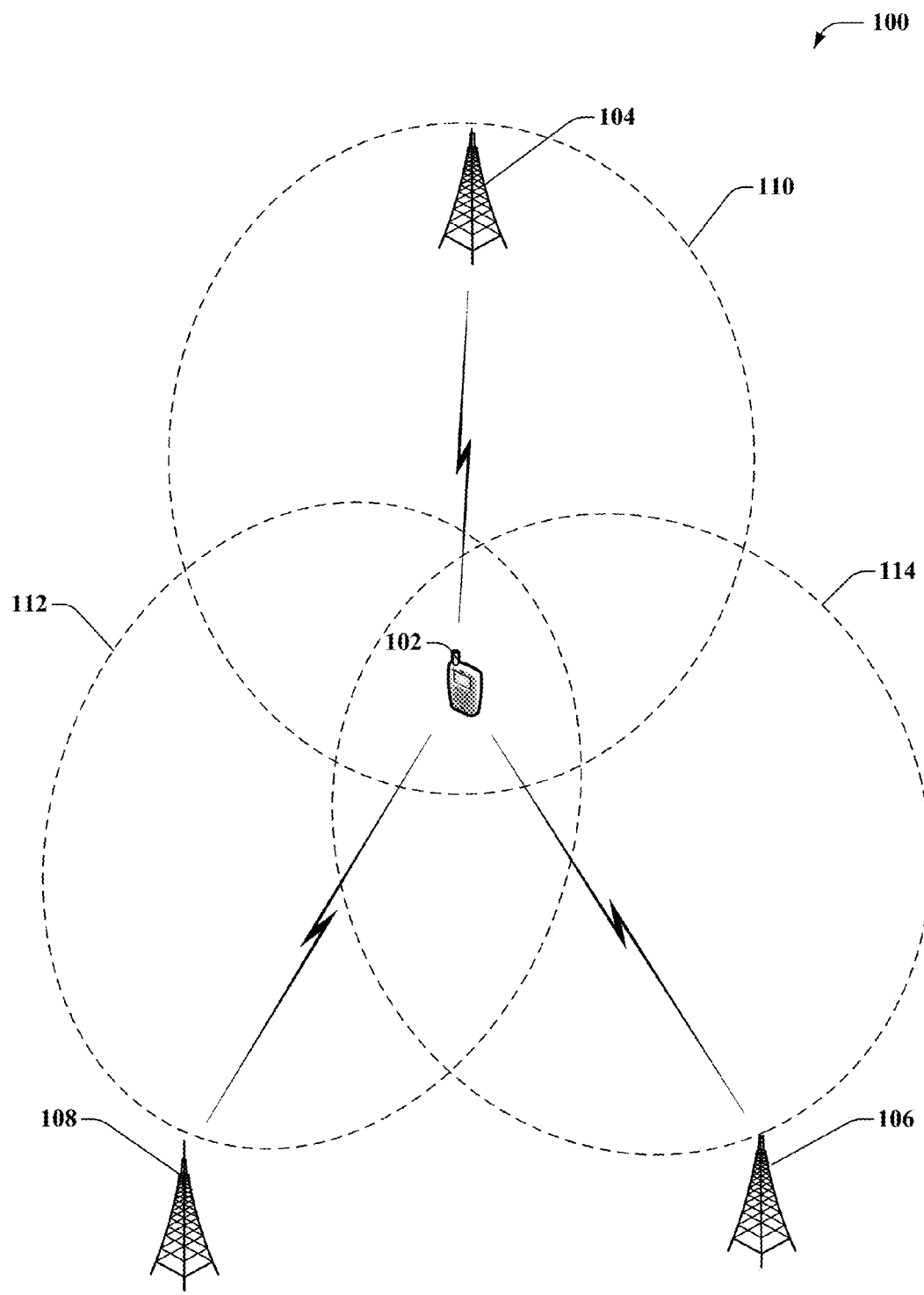
FIG. 1 is a block diagram illustrating an example, non-limiting embodiment of a mobile device locating system in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

To preclude disrupting geolocation of mobile devices performed by a mobile network, a radio repeater system is provided to disable itself when the radio repeater may negatively impact geolocation. The radio repeater system measures incident radio signals from one or more transmitting base station radios and determines whether to amplify and repeat the incident radio signals based on the number of such signals and their absolute signal strengths with an algorithm that specifically prevents such repeated signals from negatively impacting geolocation of nearby mobile units.

Various embodiments disclosed herein relate to a radio repeater system that provides additional network coverage for a localized area. The localized area can include enclosed spaces such as buildings or transportation terminals. In some embodiments, the repeater can be mounted inside or outside the building, and repeat and amplify signals sent between mobile devices and the base stations devices. In other embodiments, an antenna of a radio repeater can be mounted outside a building or other enclosure to receive and transmit signals from and to base station devices, and another antenna of the radio repeater can be located inside the building or enclosure to receive and transmit signals from and to mobile devices. The radio repeater system can monitor the signals received from the base station devices, and if there are at least three signals of a predetermined signal strength, the radio repeater can disable itself to avoid interfering with mobile locating performed by the network. The radio repeater can remain disabled until the conditions that led to the disabling have passed. If the radio repeater receives less than three signals that fail to meet the predetermined signal strength, the radio repeater can remain enabled, since the network would be unlikely to successfully locate a mobile device in the radio repeater range, whether the radio repeater was enabled or not.

For these considerations as well as other considerations, in one or more embodiments, a system includes a memory to store instructions and a processor, coupled to the memory to facilitate execution of the instructions to perform operations including determining a number of base station devices from which signals are received. The operations also include determining whether the signals and the number of base station devices satisfy a defined criterion, wherein the defined criterion relates to a parameter associated with locating a mobile device. The operations further include disabling a repeater device in response to the defined criterion being determined to be satisfied.

In another embodiment, a method includes receiving, by a device comprising a processor, signals from a set of base station devices and determining a number of base station devices that the set of base station devices comprises. The method further includes determining whether the signals satisfy a criterion, wherein the criterion is associated with signal strength. The method also includes, in response to the criterion being determined to be satisfied for the signals from at least three base station devices, disabling a repeater device.

In another embodiment, a computer readable storage device storing executable instructions, that in response to execution, cause a system comprising a processor to perform operations. That operations can include determining a number of base station devices from which signals are received. The operations can further include determining whether the signals and the number of base station devices satisfy a defined criterion, wherein the defined criterion relates to a parameter associated with locating a mobile device. The operations also include, in response to the defined criterion being determined to be satisfied, disabling a repeater device.

Turning now to FIG. 1, illustrated is an example, non-limiting embodiment of a mobile device locating system 100 in accordance with various aspects described herein. System 100 includes a mobile device 102 that can be located using base station devices 104, 106, and 108. Macrocells (i.e., base station devices) 104, 106, and 108 can have overlapping coverage areas 110, 112, and 114. Mobile device 102, which can be located in an area that is covered by base station devices 104, 106, and 108, can send and receive communication signals from each of the three base station devices.

It is to be appreciated that while FIG. 1 shows mobile device 102 within range of three macrocells, any number of macrocells is possible depending on the physical location. In some geographic locations, the number of macrocells could be as high as 10-15 or there could be as few as 1 macrocell.

Macrocells 104, 106, and 108, can be configured to send out regular signals that can be received by mobile devices in range of macrocells. The signals can be received and processed by the mobile devices even when the mobile device is not actively engaged in a call. In this way, the network based locating system can operate using network overhead resources that can be cheaper and less resource intensive than communications sent over an application layer datalink.

The signals can contain a code that identifies the macrocell that sent the signal. Each macrocell can have a unique signature, so that the signal can be positively identified as belonging to a specific macrocell. The mobile device 102 can analyze the signals when they are received, and compare the times of receipt. When signals arrive at different times that can indicate that the signals had different distances to travel, and thus the relative distances of the macrocells can be determined. These time differences are the observed time differences and there can be an observed time difference for each macrocell within range of mobile device 102.

Figure 2:
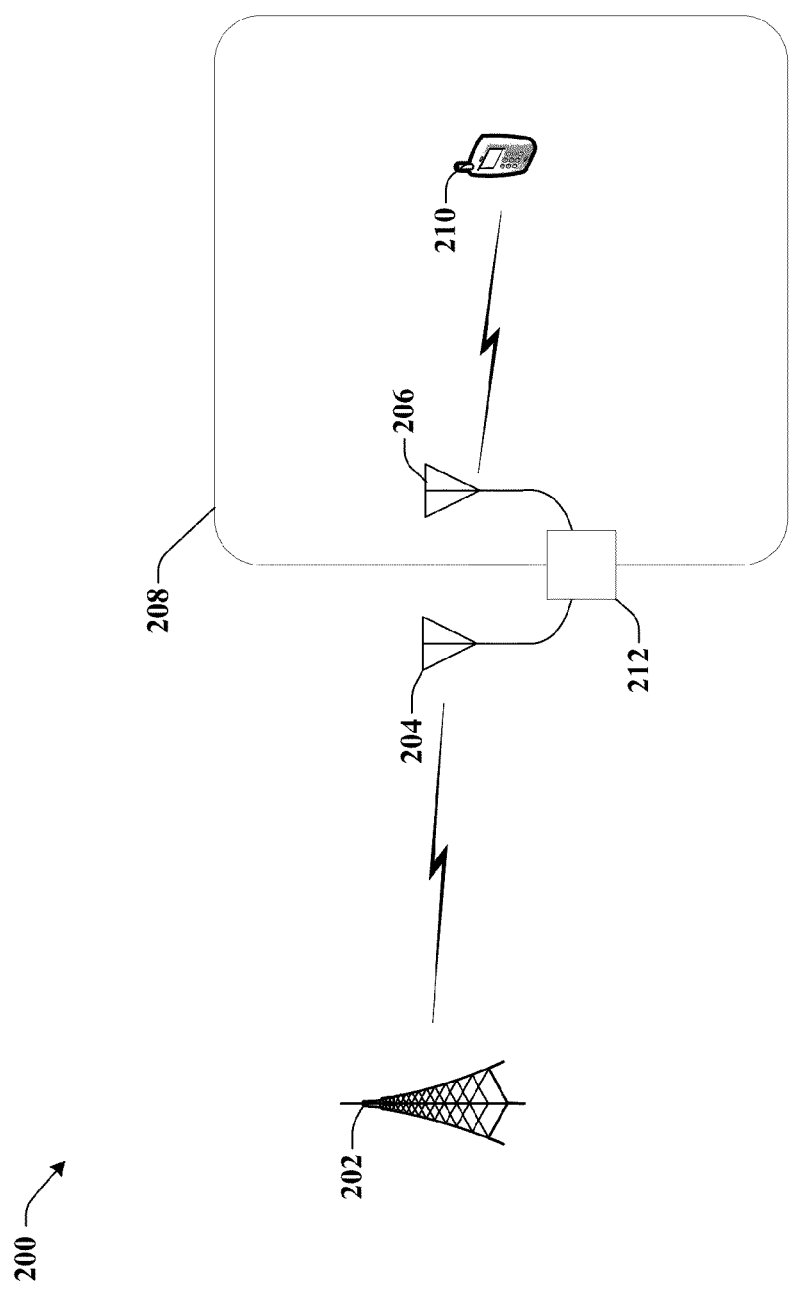
FIG. 2 is a block diagram illustrating an example, non-limiting embodiment of a radio repeater system in accordance with various aspects described herein.

Turning now to FIG. 2, illustrated is a block diagram illustrating an example, non-limiting embodiment of a radio repeater system 200. Radio repeater system 200 includes a base station device 202 that can transmit signals to mobile devices within its coverage area. A radio repeater 212 can receive the transmission from base station device 202 at antenna 204 and boost and retransmit the signal from antenna 206 to a mobile device 210 within a building and/or area 208.

The radio repeater 212 can monitor incoming transmissions from base stations and determine how many base stations have sent signals, and how strong the signals are. In the embodiment shown in FIG. 2, radio repeater 212 can determine that since a signal has only been received from one base station (e.g., base station device 202), radio repeater 212 can repeat and/or boost the signal and transmit it to mobile device 210 in building and/or area 208. In this embodiment, since there is only one base station nearby, radio repeater 212 can determine that mobile device 210 cannot be located by the network, and so any interference or inherent timing delays introduced by radio repeater 212 will not have any effect on mobile location, so the radio repeater 212 is free to repeat and/or boost the signal.

In some embodiments, when radio repeater 212 determines that only one or two base station devices (e.g., base station device 202 in this embodiment) are within range, radio repeater 212 will skip measuring the signal strength of the signal received from base station device 202, since with only one base station device in range, it does not matter how strong the signal is. With only one or two base station devices, multilateration will not locate the mobile device 210, and so the radio repeater 212 will not interfere with the mobile location.

In an embodiment of the subject disclosure, radio repeater 212 can measure the signal strength of a signal received from base station device 202, even in the case when only one or two base station devices are within range. If the signal strength is sufficiently high enough where repeating the signal will not be helpful for communication, radio repeater 212 can disable itself.

Figure 3:
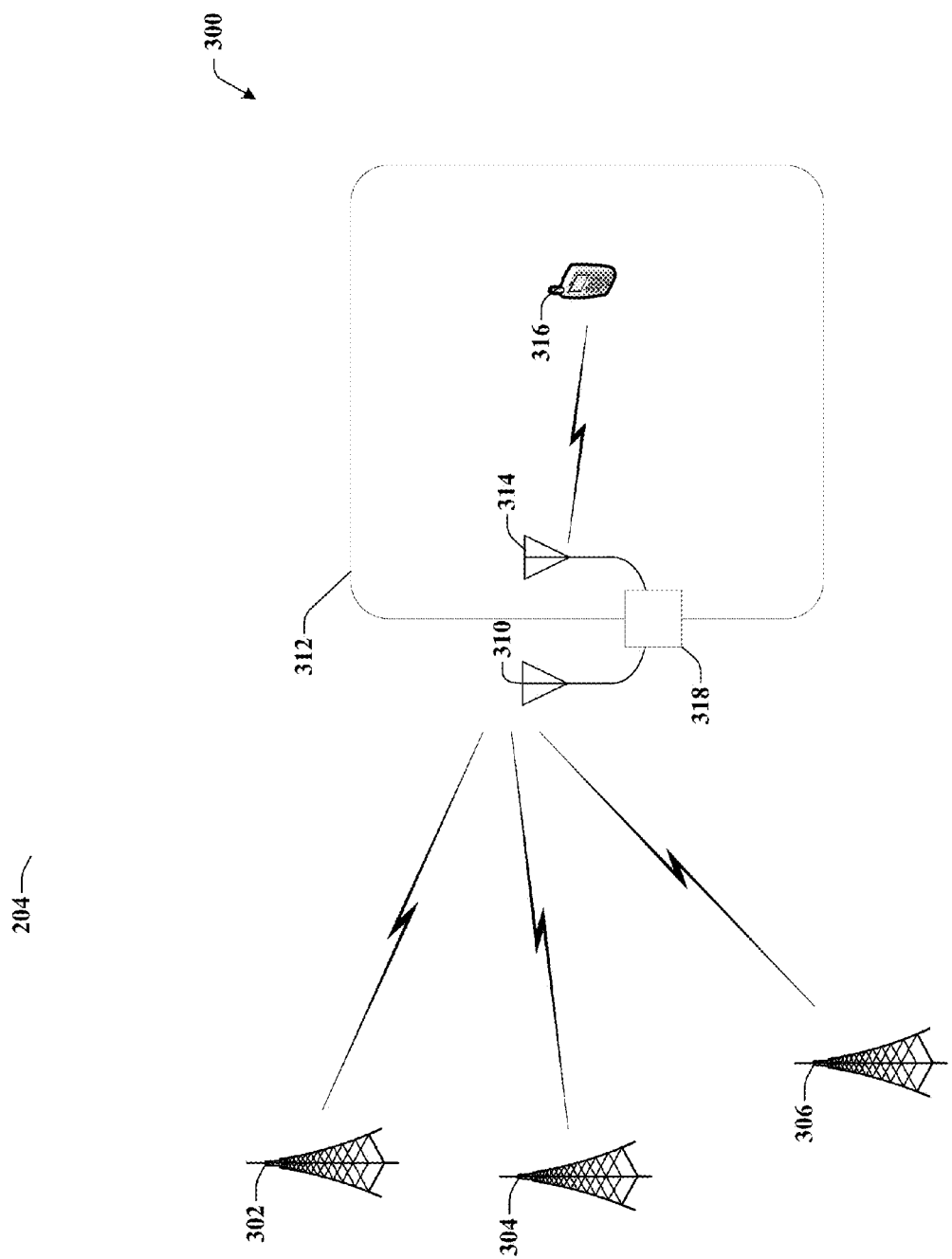
FIG. 3 is a block diagram illustrating an example, non-limiting embodiment of a radio repeater system in accordance with various aspects described herein.

Turning now to FIG. 3, illustrated is a block diagram illustrating an example, non-limiting embodiment of a radio repeater system 300. Radio repeater system 300 includes base station devices 302, 304, and 306 that can transmit signals to mobile devices within their coverage areas. A radio repeater 318 can receive the transmission from base station devices 302, 304, and 306 at antenna 310 and boost and retransmit the signal from antenna 314 to a mobile device 316 within a building and/or area 312.

Radio repeater 318 can monitor incoming transmissions from base stations within range and determine how many base stations have sent signals and how strong the signals are. In the embodiment shown in FIG. 3, radio repeater 318 determines that three base stations (e.g., 302, 304, and 306) are within range. Even though multilateration can be performed when three base station devices are within range of the repeater device 318 (or more specifically, the antenna 310), the signal strengths of each of the signals sent from base station devices 302, 304, and 306 have to be high enough to reach the mobile device 316 within building 312. In other embodiments, where there may be more than three base station devices within range of the repeater device 318, at least three of the base station devices must have strong enough signals to reach the mobile device 316 in order for the radio repeater 318 to disable itself.

In the embodiment shown in FIG. 3, one or more of the signals sent from base station devices 302, 304, and 306 are not strong enough to reach mobile device 316, and so repeater 318 remains enabled to allow mobile device 316 to communicate with the mobile network. Since multilateration would not be effective in this embodiment, leaving the radio repeater 318 enabled will not have negative effects on mobile location efforts by the network.

It is to be appreciated that while FIG. 3 shows radio repeater 318 having antenna 310 located outside the building 312 and antenna 314 located inside building 312, in other embodiments, other configurations are possible, with one or more antennas located in the same place.

Figure 4:
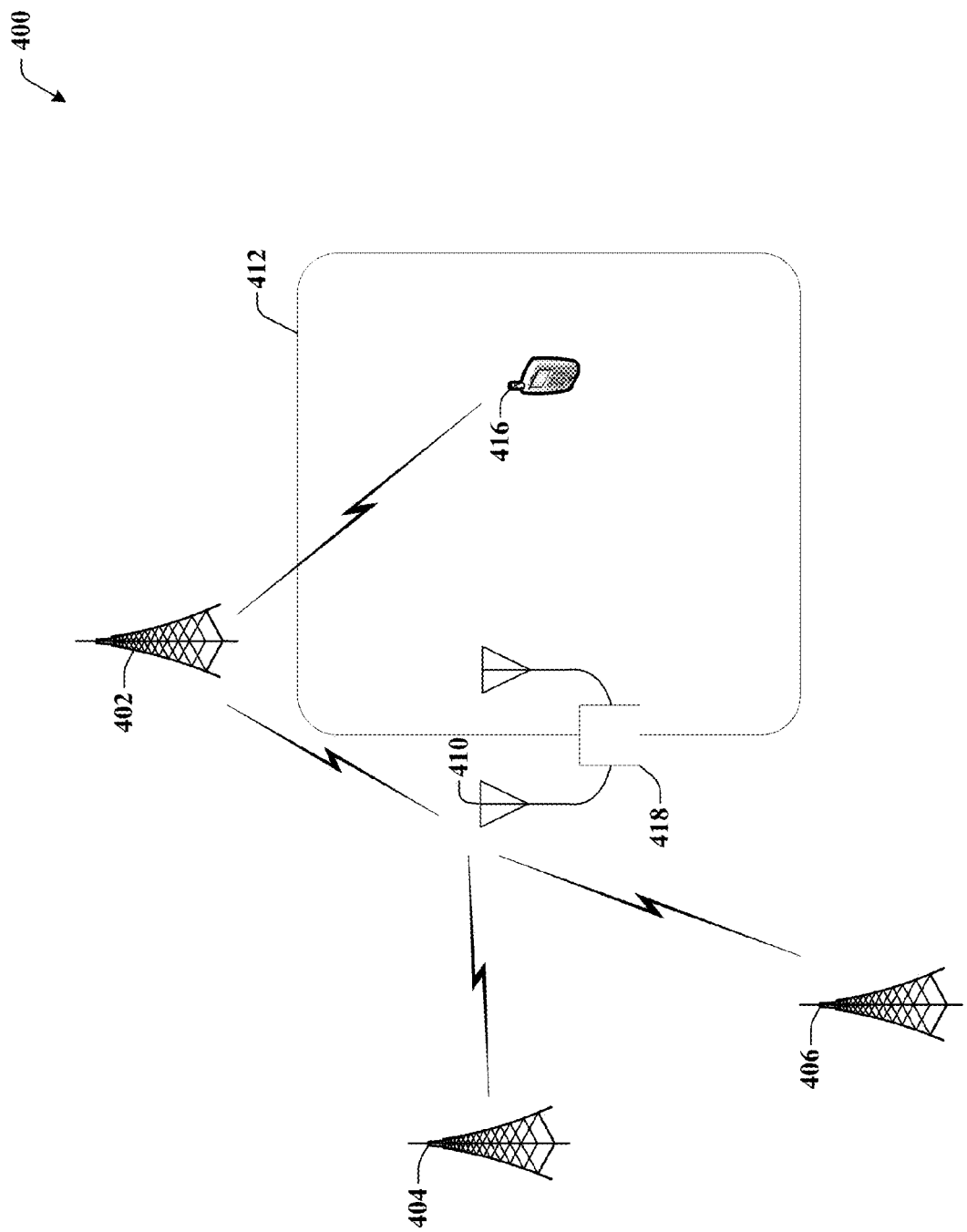
FIG. 4 is a block diagram illustrating an example, non-limiting embodiment of a radio repeater system in accordance with various aspects described herein.

Turning now to FIG. 4, illustrated is a block diagram illustrating an example, non-limiting embodiment of a radio repeater system 400. Radio repeater system 400 includes base station devices 402, 404, and 406 that can transmit signals to mobile devices within their coverage areas. A radio repeater 418 can receive the transmission from base station devices 402, 404, and 406 at antenna 410 and determine that the signals from the three base station devices are strong enough to communicate with mobile device 416 within building/area 412, and thus perform multilateration. Upon determining that the signals are strong enough, radio repeater 418 can disable itself until conditions are such that a multilateration will not be successful, at which point the radio repeater will be enabled.

The signal strength level for the signals from base stations devices 402, 404, and 406 at which radio repeater 418 determines that multilateration can be performed on mobile device 416 can be predetermined based on attributes of the coverage area 412 that radio repeater 418 is located at. For instance, relatively small buildings will only attenuate signals a little bit, so therefore radio repeater 418 will be disabled when the signals are at a lower signal strength value than if the building/coverage area 412 was larger, or made out of materials that highly attenuate radio signals. The radio repeater 418 can thus be programmed ahead of time based on the environment. In other embodiments, radio repeater 418 can determine signal strength loss/attenuation in the building 412, and adjust the settings based on the determination.

Figure 5:
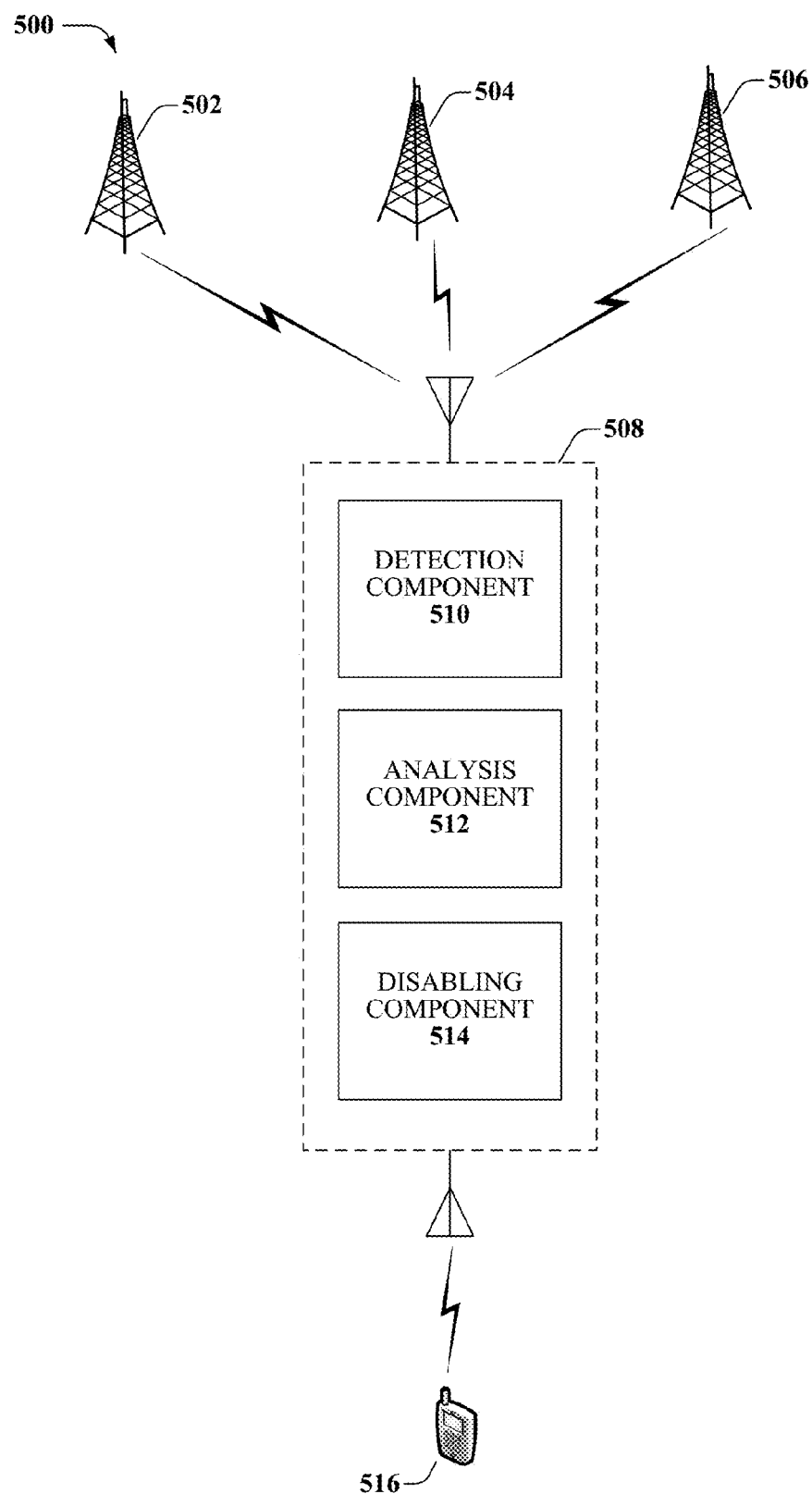
FIG. 5 is a block diagram illustrating an example, non-limiting embodiment of a radio repeater system in accordance with various aspects described herein.

Turning now to FIG. 5, illustrated is an example, non-limiting embodiment of a radio repeater system 500 in accordance with various aspects described herein. Radio repeater system 500 includes a radio repeater 508 that receives signals from one or more base station devices (in the embodiment shown in FIG. 5, base station devices 502, 504, and 506) and can repeat the signals to mobile device 516.

A detection component 510 can be provided to determine a number of base stations that are in range, and have had signals received by the radio repeater 508. Detection component 510 can determine the number of base stations in range based on transmitter ID tags encoded in the signals. The detection component 510 can also determine a signal strength of each of the signals sent from base station devices 502, 504, and 506.

Analysis component 512 can be provided to determine whether the signals and the number of base station devices satisfy a predetermined criterion, where the predetermined criterion is related to a likelihood of locating the mobile device 516. If the predetermined criterion is satisfied, disabling component 514 can be configured to disable radio repeater 508 so that the radio repeater 508 does not interfere with multilateration.

For the predetermined criterion to be satisfied, analysis component 512 determines whether or not each of the signals sent from base station devices 502, 504, and 506 have sufficient strength (i.e., signal to noise ratio) such that the signals can penetrate the environment the mobile device 516 is located in and still have enough strength left to communicate and perform geolocation of the mobile device 516. If only one or two of the base stations have strong enough signals, then multilateration cannot be performed, and the radio repeater 508 is left enabled.

Due to signal strength losses in the environment, a signal strength offset can be introduced by the analysis component 512 to take the losses into consideration. For instance, if walls and other obstacles account for 10 dB of signal loss, and the detection component 510 determines that at an antenna of radio repeater 508 that one or more of the signals received from base station devices 502, 504, and 506 are less than 10 dB above a minimum signal strength required to locate a mobile device, the analysis component 512 can determine that the likelihood of successful multilateration is low and the radio repeater 508 will remain enabled. If each of the three signals are more than 10 dB above the minimum signal strength however, the analysis component 512 can determine that the predetermined criterion has been met, and disabling component 514 can disable the radio repeater 508. In some embodiments, an additional offset can be used as a buffer, to make the likelihood of the radio repeater 508 interfering with mobile location even lower. For example, a 10 dB buffer safety can be used as well as the 10 dB signal loss buffer. Accordingly, the repeater 508 can be disabled if each of the three signals from base stations 502, 504, and 506 are 20 dB above the minimum required to perform multilateration.

In an embodiment, once radio repeater 508 is disabled, detection component 510 can continue to monitor at predetermined intervals for signals from base stations 502, 504, and 506 (and other base stations) and determine their strengths. If detection component 510 determines that signal strength levels have decreased enough to no longer satisfy the predetermined criterion, then disabling component 514 can re-enable the radio repeater 508. Changes that can lead to re-enabling the radio repeater 508 can be due to decreased signal throughput from existing base station devices, increased signal loss in the building(s) associated with radio repeater 508, new base stations, and/or inclement weather that contributes to signal loss between the base station devices and the radio repeater 508.

It is to be appreciated that in some embodiments, fewer than three base station devices may be within range of the radio repeater 508. In that case, the detection component will only detect one or two base stations, and since multilateration will not be able to be performed, the radio repeater will stay on. In other embodiments, if there are four or more base station devices, analysis component 512 will determine if at least three of the base stations have signal strengths at or above the predetermined level. If not, then the radio repeater 508 will remain enabled.

Figure 6:
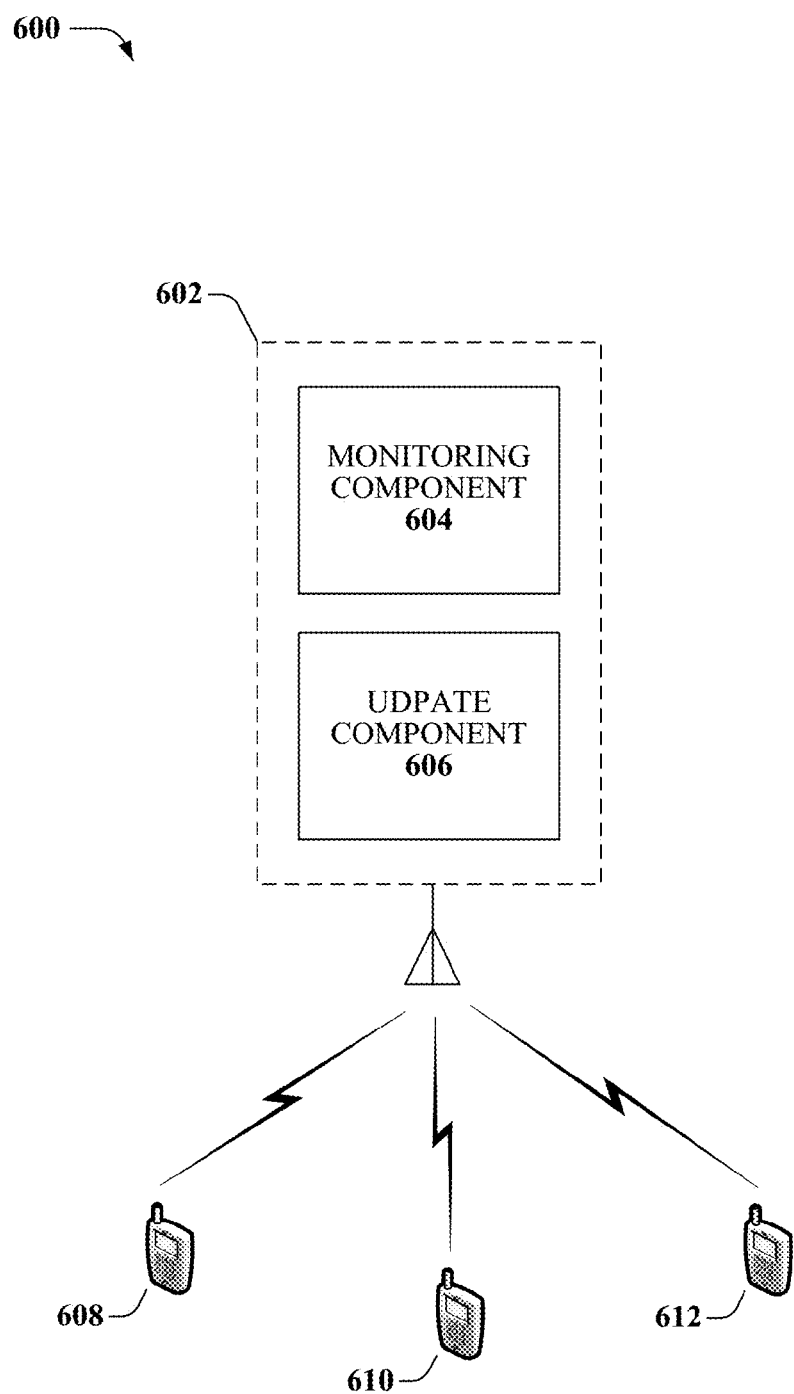
FIG. 6 is a block diagram illustrating an example, non-limiting embodiment of a radio repeater system in accordance with various aspects described herein.

Turning now to FIG. 6, illustrated is an example, non-limiting embodiment of a radio repeater system 600 in accordance with various aspects described herein. System 600 includes a radio repeater 602 that repeats and boots signals received from base stations (not shown) to mobile devices 608, 610, and 612.

The radio repeater 602 can include a monitoring component 604 that is configured to analyze signal strengths of signals received from mobile devices 608, 610, and 612, and determine whether there has been a change in signal strength loss over time in the coverage area of the radio repeater. Circumstances leading to changes in signal strength loss within the coverage area can include new construction or changing radio interference. By averaging signal strengths of signals received from mobile devices in the coverage area (e.g., mobile devices 608, 610, and 612) over time, a change in signal strength loss can be reliably determined. Update component 606 can be configured to update the offset that is used by analysis component 512 in determining whether signals from base station devices meet the predetermined criterion. As an example, if new construction within the coverage area of the radio repeater 602 increases signal strength loss, instead of a 10 dB offset, a 20 dB offset may be required. In addition to the 10 dB buffer (or any other predetermined buffer), that means signals received from the base station devices by radio repeater 602, must be at least 30 dB over the minimum required to multilaterate instead of the 20 dB that was required before the new construction.

Monitoring component 604 can also monitor to determine the types of data sessions that are being requested by mobile devices 608, 610, and 612. Data sessions that require higher bandwidth or are otherwise highly data intensive, might require signals with higher signal to noise ratios. Update component 606 can therefore increase the signal strength threshold value at which the radio repeaters are disabled in order to account for the data intensive data sessions used by mobile devices 608, 610, and 612.

Figure 7:
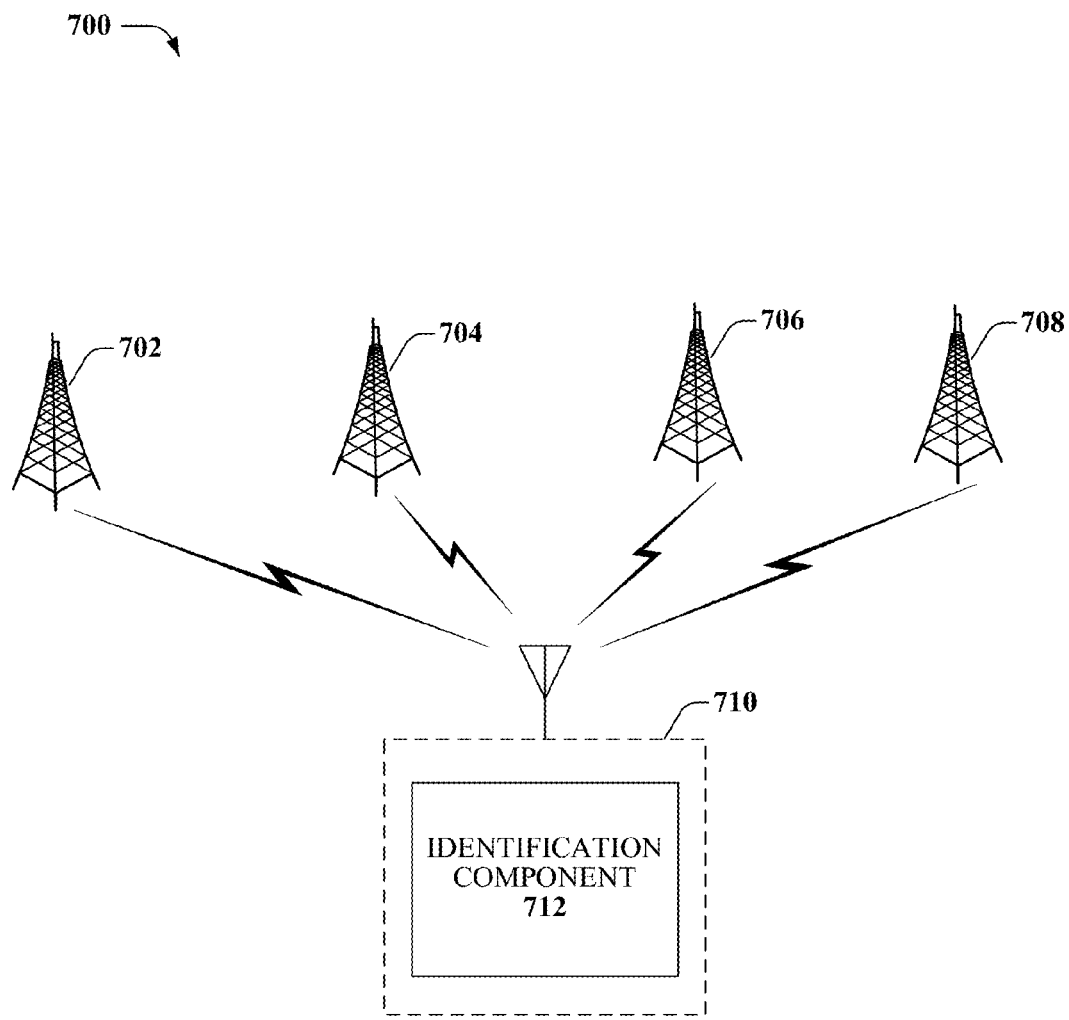
FIG. 7 is a block diagram illustrating an example, non-limiting embodiment of a radio repeater system in accordance with various aspects described herein.

Turning now to FIG. 7, illustrated is an example, non-limiting embodiment of a radio repeater system 700 in accordance with various aspects described herein. System 700 can include a radio repeater 710 that receives signals from base station devices 702, 704, 706, and 708.

Identification component 712 can determine the network that each of the base station devices belong to based on ID tags or other metadata encoded in the signals. Based on whether the network associated with the radio repeater 710 is associated with the networks of the signals, the radio repeater 710 can determine whether the signals satisfy the predetermined criterion. If at least three of the four base station devices from 702, 704, 706, and 708, match a network associated with the radio repeater 710, and are of a sufficient strength to satisfy the predetermined criterion, then radio repeater 710 will disable itself. Otherwise, even if all four signals are strong enough, but only one or two of them and the radio repeater 710 belong to a common network, then there would be no multilateration, and radio repeater 710 can remain enabled.

Figure 8:
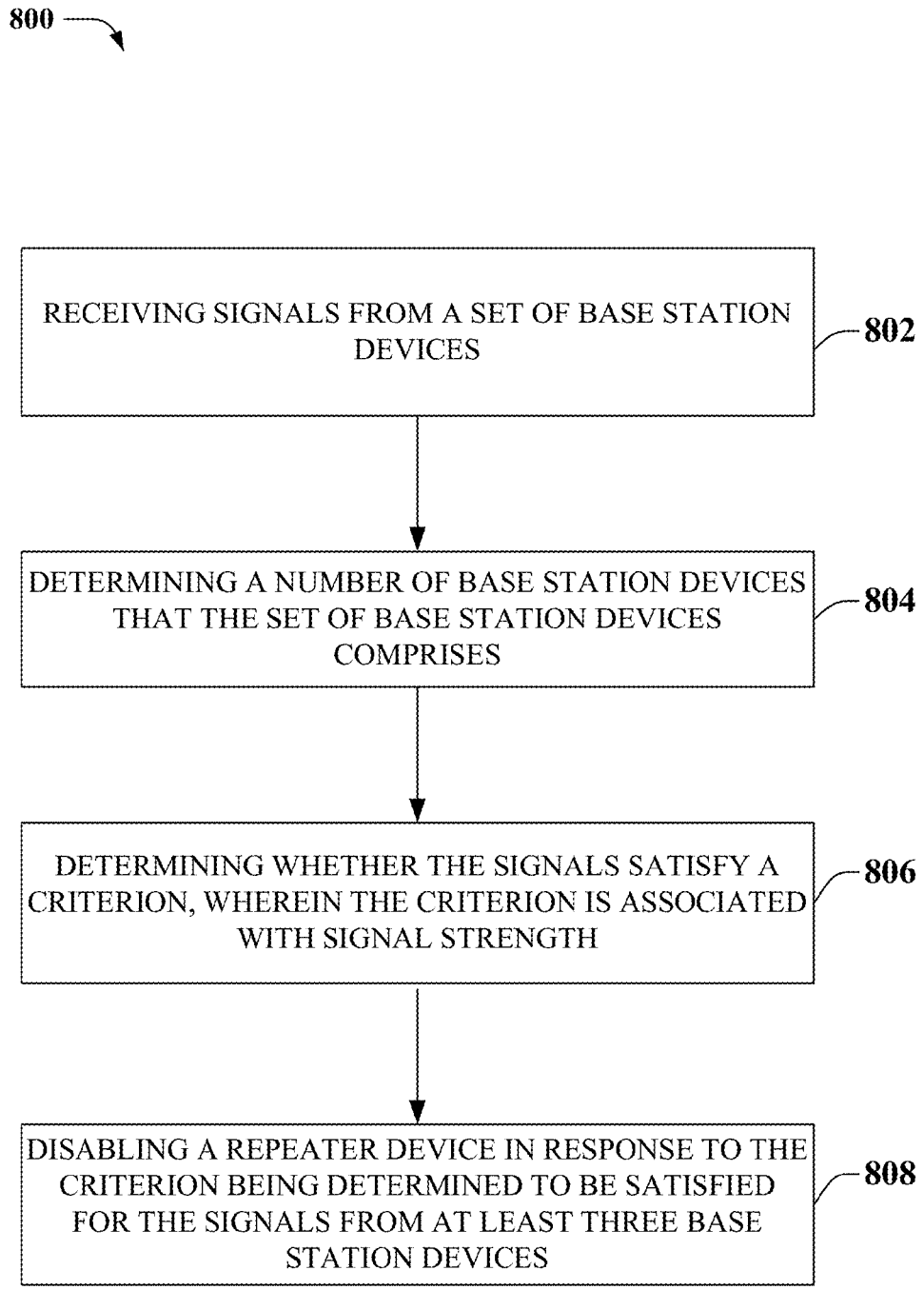
FIG. 8 illustrates a flow diagram of an example, non-limiting embodiment of a method for disabling a radio repeater as described herein.

FIG. 8 illustrates a process in connection with the aforementioned systems. The process in FIG. 8 can be implemented for example by systems 100, 200, 300, 400, 500, 600, and 700 and illustrated in FIGS. 1-7 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 illustrates a flow diagram of an example, non-limiting embodiment of a method for providing a radio repeater system as described herein. Methodology 800 can begin at step 802, where signals are received from a set of base station devices (e.g., at antennas 204, 310, 410, and etc.). At 804, a number of base stations that comprise the set of base stations is determined (e.g., by detection component 510). The number of base stations can be determined based on analyzing ID tags or other metadata that is encoded into the signals.

At 806, it can be determined whether each of the signals satisfy a criterion, wherein the criterion is associated with signal strength (e.g., by detection component 510 and analysis component 512). The signal to noise ratio or signal strength of each of the signals from the set of base stations can be determined, and then compared to the criterion. The criterion can be based on the signal strength required to perform multilateration on mobile devices within a coverage area that is served by the radio repeater device. The criterion can also take into the account the offset for signal loss in the coverage area as well as a buffer offset.

At 808, the repeater device can be disabled in response to the criterion being determined to be satisfied for the signals from at least three base station devices (e.g., by disabling component 514). Since multilateration requires three base station devices to communicate with the mobile device, at least three base station devices must have signal strengths strong enough to reach the mobile devices. If the signals meet the predetermined criterion, they will likely be of sufficient strength to reach the mobile device within the coverage area of the repeater device, and so the repeater device is disabled to avoid interfering with the multilateration.

Figure 9:
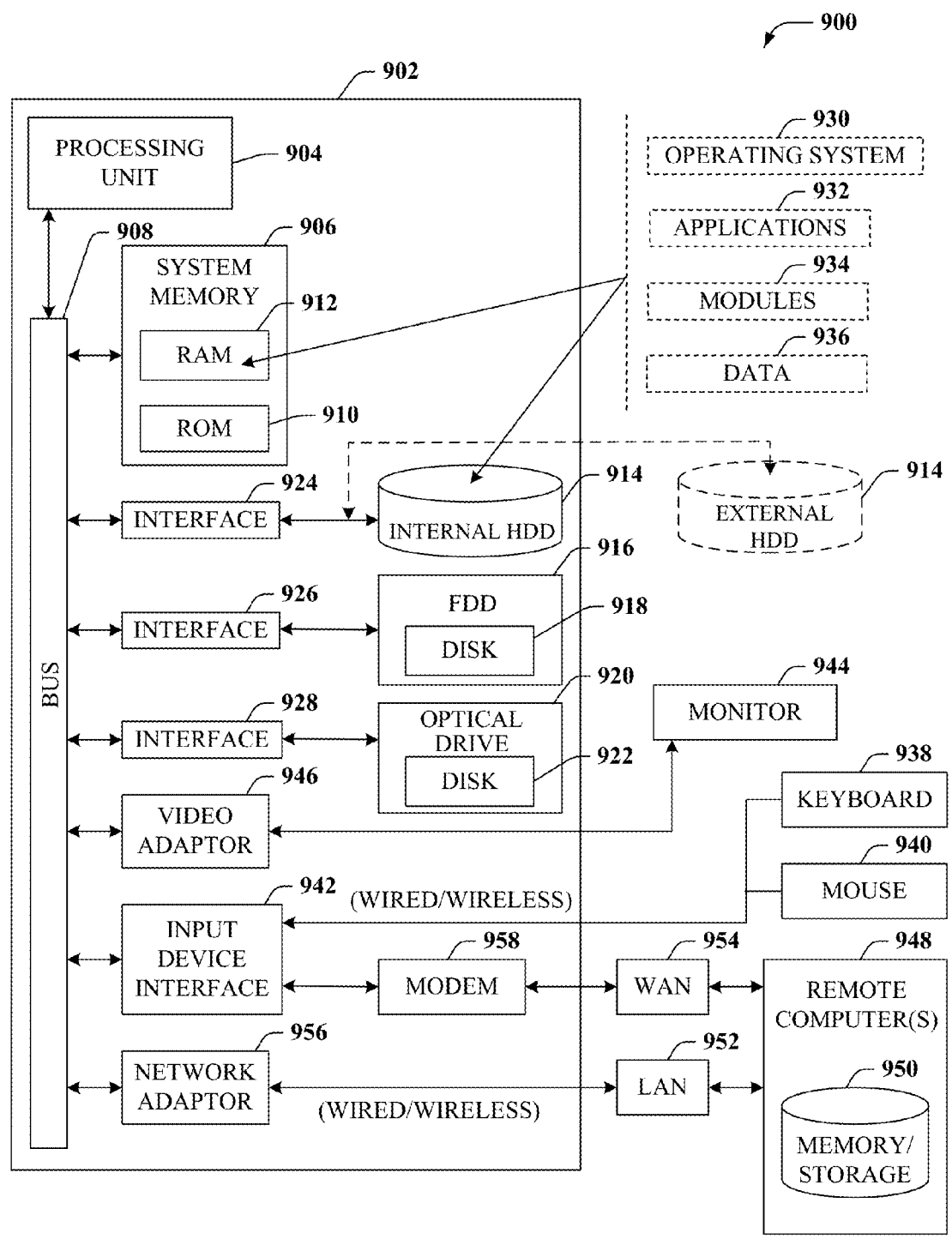
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, the computer can be or be included within the radio repeater system disclosed in any of the previous systems 200, 300, 400, 500, 600 and/or 700.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless AP disposed thereon for communicating with the wireless adapter 956.

When used in a WAN networking environment, the computer 902 can include a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

Figure 10:
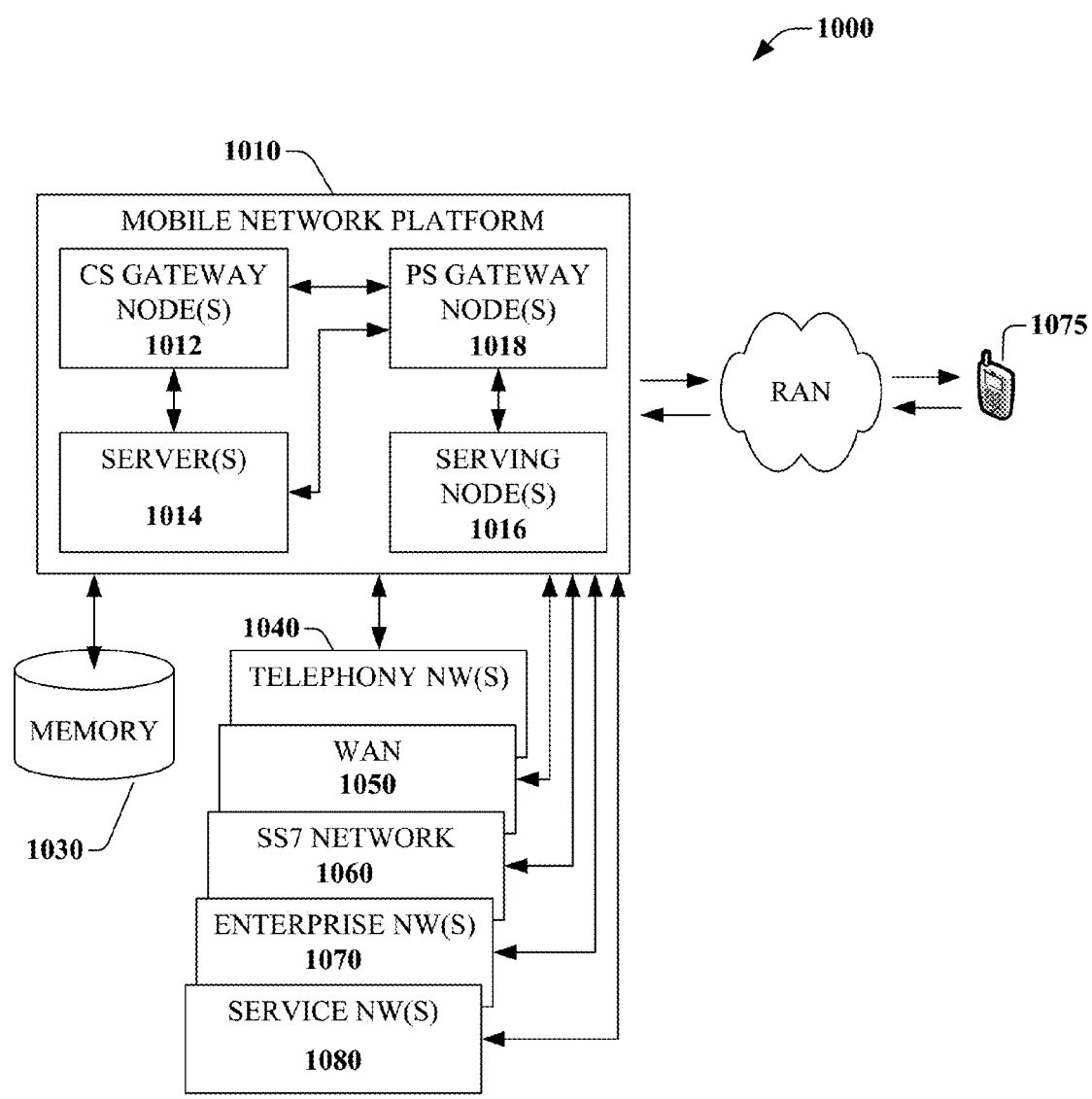
FIG. 10 is a block diagram of an example, non-limiting embodiment of a mobile network platform in accordance with various aspects described herein.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1075.

It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=\text{confidence}$ (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   monitoring radio signals received at a repeater device; and
   in response to characteristics of the radio signals satisfying criteria, disabling the repeater device from repeating the radio signals, wherein the criteria comprise a first criterion requiring at least three base station devices to be represented by information carried by the radio signals, and a second criterion requiring signal strengths of respective radio signals from the at least three base station devices to satisfy a signal strength threshold.

2. The system of claim 1, determining a number of base station devices represented by the information carried by the radio signals.

3. The system of claim 1, determining a signal strength of a radio signal of the radio signals.

4. The system of claim 1, wherein the operations further comprise determining the signal strength threshold based on determining a signal strength loss in a coverage area of the repeater device.

5. The system of claim 1, wherein the operations further comprise determining the signal strength threshold based on determining a type of a data session represented by information carried by the radio signals.

6. The system of claim 1, wherein the criteria further comprise a third criterion requiring the at least three base station devices to be operating on a common network.

7. The system of claim 1, wherein the operations further comprise, after the disabling of the repeater device, re-enabling the repeater device in response to the characteristics of the radio signals being determined not to satisfy the criteria.

8. A method, comprising:
   observing, by a device comprising a processor, signals received at a repeater device;
   in response to a determination that characteristics of the signals satisfying criteria, disabling, by the device, the repeater device from repeating the signals, wherein the criteria comprise a first criterion that at least three base station devices be represented by information carried by the signals and a second criterion that signal strengths of respective signals from the at least three base station devices satisfy a signal strength threshold.

9. The method of claim 8, further comprising: determining, by the device, a quantity of base station devices represented in the signals.

10. The method of claim 8, further comprising: determining, by the device, a signal strength of a signal of the signals.

11. The method of claim 8, further comprising determining, by the device, the signal strength threshold based upon determining an attribute of an environment in which the repeater device is operating.

12. The method of claim 8, further comprising setting, by the device, the signal strength threshold based upon determining a type of a data session represented in the signals.

13. The method of claim 8, wherein the criteria further comprise a third criterion that the at least three base station devices be operating on a common network.

14. The method of claim 8, further comprising, after the disabling of the repeater device, re-enabling the repeater device in response to the characteristics of the signals not satisfying the criteria.

15. A non-transitory machine-readable storage medium, comprising executable instructions that, when executed by a processor, facilitate performance of operations, comprising:
   receiving radio signals; and
   in response to characteristics of the radio signals meeting criteria, disabling a repeater device from repeating the radio signals, wherein the criteria comprise a criterion requiring that at least three base station devices be represented by information carried by the radio signals and that signal strengths of respective radio signals from the at least three base station devices meet a signal strength threshold.

16. The non-transitory machine-readable storage medium of claim 15, determining a number of base station devices represented by the radio signals.

17. The non-transitory machine-readable storage medium of claim 15, determining a signal strength a signal strength of a radio signal of the radio signals.

18. The non-transitory machine-readable storage medium of claim 15, wherein the operations further comprise determining the signal strength threshold based on determining an attribute of an environment in which the repeater device is operating.

19. The non-transitory machine-readable storage medium of claim 15, wherein the operations further comprising determining the signal strength threshold based upon determining a type of a data session represented by the radio signals.

20. The non-transitory machine-readable storage medium of claim 15, wherein the criterion further requires that the at least three base station devices operate on a common network.

* * * * *